US012625410B2

(12) United States Patent
Kwon

(10) Patent No.: US 12,625,410 B2
(45) Date of Patent: May 12, 2026

(54) HYBRID DISPLAY AND CONTROL METHOD THEREOF

(71) Applicant: KOREA ELECTRONICS TECHNOLOGY INSTITUTE, Seongnam-si (KR)

(72) Inventor: Soon Hyung Kwon, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 281 days.

(21) Appl. No.: 18/382,833

(22) Filed: Oct. 23, 2023

(65) Prior Publication Data

US 2024/0134241 A1 Apr. 25, 2024
US 2024/0231172 A9 Jul. 11, 2024

(30) Foreign Application Priority Data

Oct. 24, 2022 (KR) ......................... 10-2022-0137461

(51) Int. Cl.
*G02F 1/1677* (2019.01)
*G02F 1/167* (2019.01)
(Continued)

(52) U.S. Cl.
CPC ............ *G02F 1/1677* (2019.01); *G02F 1/167* (2013.01); *G02F 1/1685* (2019.01); *G02F 2001/1678* (2013.01)

(58) Field of Classification Search
CPC ...... G02F 1/1677; G02F 1/167; G02F 1/1685; G02F 2001/1678; G02F 2201/44;
(Continued)

(56) References Cited

U.S. PATENT DOCUMENTS

2011/0134508 A1* 6/2011 Kawashima ............ G02F 1/167
252/301.16
2013/0114125 A1* 5/2013 Kim ........................ G02F 1/172
359/296
(Continued)

FOREIGN PATENT DOCUMENTS

JP 2008-299079 A 12/2008
JP 2011-221092 A 11/2011
(Continued)

OTHER PUBLICATIONS

Office Action issued on Jun. 27, 2025, for corresponding Korean Patent Application No. 10-2022-0137461, along with an English machine translation (12 pages).

*Primary Examiner* — Charles S Chang
(74) *Attorney, Agent, or Firm* — Hauptman Ham, LLP

(57) ABSTRACT

A hybrid display is disclosed. The hybrid display includes an electrophoretic module configured to display information through reflection of light incident from an exterior thereof, and a light emitting module formed at a lower surface of the electrophoretic module, to output color light to the electrophoretic module. The electrophoretic module includes a first substrate, a second substrate spaced apart from the first substrate, a plurality of capsules disposed between the first substrate and the second substrate, each of the capsules containing particles having a color and a fluid having a color therein, and an electrode configured to apply an electric filed to the capsule, thereby moving the particles. The color light output from the light emitting module is mixed with the color of the fluid, and is then outwardly output. The hybrid display exhibits excellent visibility even in a dark environment, and the background color thereof is variously changeable.

8 Claims, 3 Drawing Sheets

(51) Int. Cl.
 *G02F 1/1675* (2019.01)
 *G02F 1/1685* (2019.01)
(58) Field of Classification Search
 CPC ...... G02F 1/1676; G09G 3/344; H10K 50/13;
 H10H 20/813
 See application file for complete search history.

(56) References Cited

U.S. PATENT DOCUMENTS

| | | | |
|---|---|---|---|
| 2014/0374716 A1* | 12/2014 | Kim ....................... | H10K 59/50 |
| | | | 257/40 |
| 2018/0059499 A1* | 3/2018 | Klement ................ | H10K 59/50 |
| 2022/0262323 A1* | 8/2022 | Deliwala ................ | G02F 1/167 |

FOREIGN PATENT DOCUMENTS

| | | |
|---|---|---|
| KR | 10-2012-0049454 A | 5/2012 |
| KR | 10-2017-0112128 A | 10/2017 |

\* cited by examiner

HYBRID DISPLAY AND CONTROL METHOD THEREOF

CROSS REFERENCE TO RELATED APPLICATION

This patent document claims the priority and benefits of Korean Patent Application No. 10-2022-0137461, filed Oct. 24, 2022, the entire contents of which is incorporated herein by reference for all purposes.

TECHNICAL FIELD

The present disclosure relates to a hybrid display and a control method thereof.

BACKGROUND

Displays are classified into a display of a transmissive type in which an image is displayed through transmission of backlight and a display of a reflective type in which an image is displayed through reflection of ambient light. The transmissive type display exhibits great consumption of electrical energy because a backlight should always operate. As such a transmissive type display, there are an LED display, an OLED display, a quantum dot display, etc. The reflective type display exhibits low consumption of electrical energy because no backlight is required, even though visibility is low when ambient light is dark. As such a reflective type display, there is an electrophoretic display, etc.

SUMMARY

Therefore, the present disclosure has been made in view of the above problems, and it is an object of the present disclosure to provide a hybrid display of a mixed type of a reflective type and a transmissive type.

In accordance with an aspect of the present disclosure, the above and other objects can be accomplished by the provision of a hybrid display including an electrophoretic module configured to display information through reflection of light incident from an exterior thereof, and a light emitting module formed at a lower surface of the electrophoretic module and configured to output color light to the electrophoretic module, wherein the electrophoretic module includes a first substrate, a second substrate disposed to be spaced apart from the first substrate, a plurality of capsules disposed between the first substrate and the second substrate, each of the capsules containing particles having a color and a fluid having a color therein, and an electrode configured to apply an electric filed to the capsule, thereby moving the particles, wherein the color light output from the light emitting module is mixed with the color of the fluid, and is then outwardly output.

In accordance with an embodiment, the light emitting module may include a first emission layer configured to output light of a first color, a second emission layer configured to output light of a second color, and a third emission layer configured to output light of a third color. The first emission layer, the second emission layer, and the third emission layer may be made of transparent materials, respectively, and may be formed through sequential stacking thereof.

In accordance with an embodiment, the light emitting module may include a first emission layer configured to output light of a first color, a second emission layer configured to output light of a second color, and a third emission layer configured to output light of a third color. Each of the first emission layer, the second emission layer, and the third emission layer may include a light source and a light guide plate made of a transparent material, and the light guide plates of the first emission layer, the second emission layer, and the third emission layer may be formed through sequential stacking thereof.

In accordance with an embodiment, each of the plurality of capsules may include an A-particle of an A-color, a B-particle of a B-color, and a fluid of a C-color. The electrode may include a first electrode formed on the first substrate using a transparent material and disposed at one side under the capsule, a second electrode formed on the first substrate using a transparent material and disposed at an opposite side under the capsule, and a third electrode formed under the second substrate using a transparent material and disposed on the capsule.

In accordance with an embodiment, the fluid of the C-color may include a dye or a pigment representing the C-color, and may selectively further include glitter or a pearl.

In another aspect of the disclosure, there is provided a control method of a hybrid display including controlling an electrophoretic module to display information through reflection of light incident from an exterior thereof, and controlling a light emitting module formed at a lower surface of the electrophoretic module to output color light to the electrophoretic module, wherein the color light output from the light emitting module is displayed in a state of being color-mixed with a color of a fluid of a capsule in the electrophoretic module.

In accordance with an embodiment, the controlling an electrophoretic module may include moving, to one side, particles of the capsule of the electrophoretic module such that light output from the light emitting module passes through the capsule, and moving, to a front side, the particles of the capsule such that the light output from the light emitting module is blocked by the particles of the capsule, thereby causing the particles of the capsule to be outwardly displayed. The moving to one side and the moving to a front side may be independently executed on a pixel basis.

In accordance with an embodiment, the controlling a light emitting module may include individual control of operating only one of a first emission layer configured to output light of a first color, a second emission layer configured to output light of a second color, and a third emission layer configured to output light of a third color, and complex control of simultaneously operating two or more of the first emission layer, the second emission layer, and the third emission layer. One of the individual control and the complex control may be executed in accordance with given setting.

Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for best explanation.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

Figure 1:
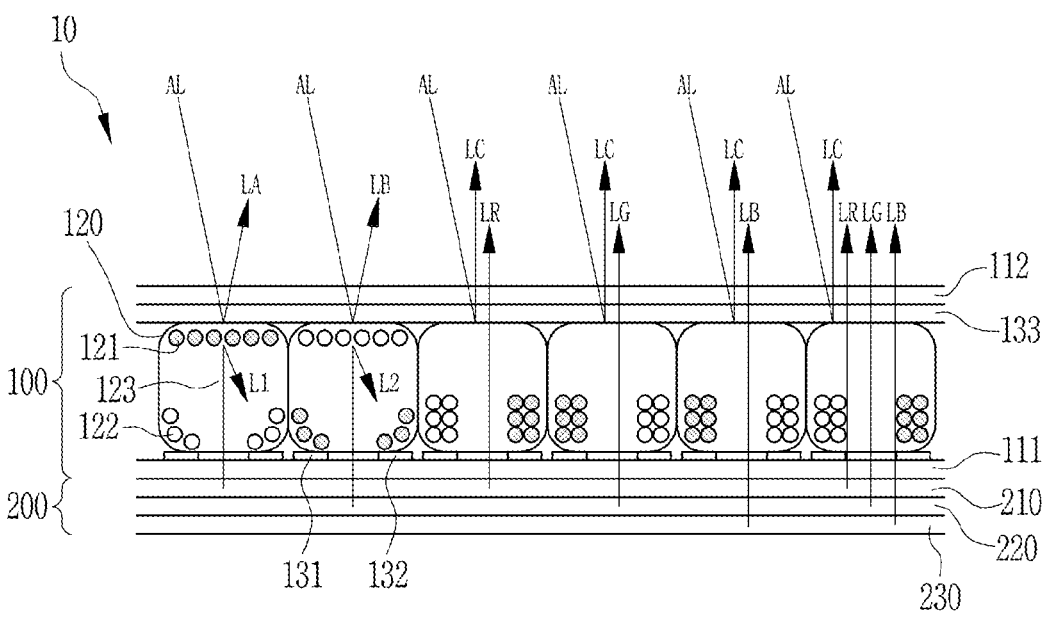
FIG. 1 is a view showing a cross-section of a hybrid display according to an embodiment of the present disclosure.

Objects, particular advantages and new features of the present disclosure will be more clearly understood from the following detailed description and preferred embodiments taken in conjunction with the accompanying drawings. However, the present disclosure is not limited to the embodiments. In the following description, when a detailed description of the relevant known function or configuration is determined to unnecessarily obscure the subject matter of the present disclosure, such detailed description will be omitted.

In the specification, in adding reference numerals for elements in each drawing, it should be noted that like reference numerals already used to denote like elements in one drawing are also used to denote the elements in another drawing wherever possible.

It should be noted that terms used herein are merely used to describe a specific embodiment, not to limit the present disclosure. Incidentally, unless clearly used otherwise, singular expressions include a plural meaning.

The drawings are not necessarily to scale and, in some instances, proportions may be exaggerated or schematically illustrated in order to clearly illustrate features of the embodiments.

It should be further understood that the terms "comprises", "comprising,", "has", "having", "includes" and/or "including", when used herein, specify the presence of stated features (for example, integers, functions, operations, or constituent elements such as components, but do not preclude the presence of other features.

In addition, the terms "one", "the other", "first", "second", etc. are used to differentiate one constituent element from another constituent element, and these constituent elements should not be limited by these terms.

Hereinafter, exemplary embodiments of the present disclosure will be described in detail with reference to the accompanying drawings.

FIG. 1 is a view showing a cross-section of a hybrid display 10 according to an embodiment of the present disclosure.

The hybrid display 10 according to the embodiment of the present disclosure may include an electrophoretic module 100 configured to display information through reflection of light incident from an exterior thereof, and a light emitting module 200 formed at a lower surface of the electrophoretic module 100 and configured to output color light to the electrophoretic module 100. The electrophoretic module 100 may include a first substrate 111, a second substrate 112 disposed to be spaced apart from the first substrate 111, a plurality of capsules 120 disposed between the first substrate

111 and the second substrate 112. Each of the capsules 120 may contain particles having a color and a fluid having a color therein. The electrophoretic module 100 may also include an electrode configured to apply an electric field to the capsules 120 in order to move the particles in the capsules 120. The color light output from the light emitting module 200 may be mixed with the color of the fluid 123 and, as such, color-mixed light may be outwardly output.

The hybrid display 10 may be formed through stacking of the electrophoretic module 100 and the light emitting module 200. The electrophoretic module 100 is stacked on the light emitting module 200 and, as such, may display information or a color in a direction thereof opposite to the light emitting module 200. The direction of the electrophoretic module 100 toward the second substrate 112 is a direction in which the electrophoretic module 100 is observed from the exterior thereof. As described above, each capsule 120 of the electrophoretic module 100 includes particles and the fluid 123, and the fluid 123 has a color. Light output from the light emitting module 200 may be changed in color while passing through the fluid 123. In other words, light output from the light emitting module 200 may be mixed with the color of the fluid 123 and, as such, color-mixed light may be outwardly displayed. In more detail, a color represented through reflection of ambient light by the fluid 123 may be mixed with the color of the light output from the light emitting module 200 at an outside and, as such, color-mixed light may be observed. Since the fluid 123 has a color, information and a color outwardly displayed by the display 10 may be in a state of being mixed with the color of the fluid 123.

The electrophoretic module 100 may display information through movement of the particles in the capsule 120 by an electric field or may allow light output from the light emitting module 200 to pass therethrough. The electrophoretic module 100 may be formed through stacking of the first substrate 111, a lower electrode, the plurality of capsules 120, an upper electrode, and the second substrate 112 in this order.

The first substrate 111 may be disposed adjacent to the light emitting module 200 with reference to the electrophoretic module 100. The second substrate 112 may be disposed far from the light emitting module 200 with reference to the electrophoretic module 100. The first substrate 111 and the second substrate 112 may be made of a material transparent to visible light. The first substrate 111 and the second substrate 112 may be made of a material selected from the group consisting of polydimethylsiloxane (PDMS), polyurethane (PU), polymethylmethacrylate (PMMA), polycarbonate, polyethylene, polypropylene, polystyrene, polyimide, cyclo-olefin copolymer (COC), parylene, and combinations thereof.

The plurality of capsules 120 may include an A-particle 121 of an A-color, a B-particle 122 of a B-color, and a fluid 123 of a C-color. Each of the plurality of capsules 120 may include a particle having a color and a fluid 123 having a color. The capsule 120 may include various kinds of particles having various colors. The capsule 120 may include a plurality of particles. For example, the capsule 120 may include a plurality of A-particles 121 having an A-color (white) and a plurality of B-particles 122 having a B-color (black). The capsule 120 may further include a plurality of D-particles having a D-color (red). In addition, the capsule 120 may further include a plurality of particles having a color different from the above-described colors.

The particles may be formed to be different from one another in polarity, charge, size, and weight in accordance with different kinds thereof. For example, the A-particle 121 may have a positive (+) charge of 1, whereas the B-particle 122 may have a negative (−) charge of 1. When particles have different polarities, directions of the particles moved by an electric field may be different from each other. When particles have different charges, velocities of the particles moved by an electric field may be different from each other. When particles have different sizes or different weights, velocities of the particles moved in the fluid 123 may be different from each other. Each particle may be movable to a position determined in accordance with the magnitude and direction of an electric field formed between the upper electrode and the lower electrode.

The fluid 123 may have the C-color. As the fluid 123 has such a color, the hybrid display 10 may represent a background color. When a particle moves to a position where the particle is not outwardly observed, the hybrid display 10 outwardly displays the color of the fluid 123. When this case is compared with the case in which only the particle has a color, the hybrid display 10 may have an effect capable of increasing the number of displayable colors because the color of the fluid 123 may be displayed.

The electrode may include a first electrode 131 formed on the first substrate 111 using a transparent material and disposed at one side under the capsule 120, a second electrode 132 formed on the first substrate 111 using a transparent material and disposed at the other side under the capsule 120, and a third electrode 133 formed under the second substrate 112 using a transparent material and disposed on the capsule 120.

The first electrode 131 and the second electrode 132 constitute the lower electrode formed under the capsule 120. The third electrode 133 constitutes the upper electrode formed on the capsule 120. The upper electrode and the lower electrode may be made of a material transparent to visible light. For example, the upper electrode and the lower electrode may be made of indium tin oxide (ITO), graphene, silver nanowires, a conductive polymer, or the like. The first electrode 131 and the second electrode 132 may be formed on the first substrate 111. The third electrode 133 may be formed under the second substrate 112. The third electrode 133 may be formed on a plurality of capsules 120.

The first electrode 131 may be formed at one side under the capsule 120, and the second electrode 132 may be formed at the other side under the capsule 120 while being spaced apart from the first electrode 131. The third electrode 133 may be formed on the capsule 120. The first electrode 131, the second electrode 132, and the third electrode 133 may be formed on a pixel basis or a capsule basis. In the case of FIG. 1, the first electrode 131, the second electrode 132, and the third electrode 133 may be formed on a capsule basis. Differently from the case of FIG. 1, a portion of one capsule 120 may be set as one pixel, or a plurality of capsules 120 may be set as one pixel. In this case, the first electrode 131, the second electrode 132, and the third electrode 133 may be formed on a pixel basis.

A-particles 121 and B-particles 122 in the capsule 120 may be moved in accordance with an electric field formed by the first electrode 131, the second electrode 132, and the third electrode 133. When the A-particles 121 move toward the first electrode 131, and the B-particles 122 move toward the second electrode 132, no particle is present at a central portion of the capsule 120. Accordingly, light emitted from the light emitting module 200 may be outwardly output after passing through the central portion of the capsule 120. For example, in the case of FIG. 1, light LR emitted from a first emission layer 210, light LG emitted from a second emission layer 220, and light LC emitted from a third emission layer 230 may be outwardly output after passing through the central portion of the capsule 120. When the A-particles 121 move toward the third electrode 133, the B-particles 122 move toward the first electrode 131 and the second electrode 132, the A particles 121 may be observed at the outside. For example, ambient light µL may be reflected by the A-particles 121 and, as such, light LA of the A-color may be observed. Light L1 emitted from the light emitting module 200 may be blocked by the A-particles 121 and, as such, may not be outwardly output. When the B-particles 122 move toward the third electrode 133, and the A-particles 121 move toward the first electrode 131 and the second electrode 132, the B-particles 122 may be observed at the outside. For example, ambient light µL may be reflected by the B-particles 122 and, as such, light LB of the B-color may be observed. Light L2 emitted from the light emitting module 200 may be blocked by the B-particles 122 and, as such, may not be outwardly output.

The light emitting module 200 may be formed under the electrophoretic module 100. The light emitting module 200 may output light to the electrophoretic module 100 when brightness of ambient light µL is low and, as such, there is an effect of enhancing visibility. The light emitting module 200 may be constituted by a plurality of layers. The light emitting module 200 may output light through an electroluminescent method, a method using organic LEDs, a method using inorganic LEDs, or various other methods. The plurality of layers included in the light emitting module 200 may emit light of different colors, respectively. The light emitting module 200 may include the first emission layer 210, which outputs light of a first color, the second emission layer 220, which outputs light of a second color, and the third emission layer 230, which outputs light of a third color. The first emission layer 210, the second emission layer 220, and the third emission layer 230 may be made of transparent materials, respectively, and may be formed through stacking thereof in the order as described above.

The first emission layer 210, the second emission layer 220, and the third emission layer 230 may emit light of different colors, respectively. For example, the first emission layer 210 may output a first color (red), the second emission layer 220 may output a second color (green), and the third emission layer 230 may output a third color (blue). The resultant color is a color with RGB expressed through additive mixing. In this case, the C-color of the fluid 123 may be determined from various colors.

Colors output from the plurality of emission layers may be determined taking into consideration the color of the fluid 123. The color of the fluid 123 may also be determined taking into consideration colors output from the plurality of emission layers. For example, when the color of the fluid 123 is green, the light emitting module 200 may include an emission layer configured to emit red light and an emission layer configured to emit blue light. That is, the color of the fluid 123, the colors of the emission layers, and the number of the emission layers may be determined totally taking into consideration the color of the fluid 123 and the colors emitted from the emission layers of the light emitting module 200.

The light emitting module 200 may be formed through stacking of a plurality of emission layers. The first emission layer 210 may be disposed adjacent to the electrophoretic module 100, the third emission layer 230 may be disposed far from the electrophoretic module 100, and the second emission layer 220 may be formed between the first emission layer 210 and the third emission layer 230. Color light output from the third emission layer 230 may reach the electrophoretic module 100 after passing through the second emission layer 220 and the first emission layer 210. Color light output from the second emission layer 220 may reach the electrophoretic module 100 after passing through the first emission layer 210.

As described above, the light emitting module 200 emits light when ambient light is dark and, as such, an enhancement in visibility may be achieved in the hybrid display 10. In addition, the light emitting module 200 emits color light even when ambient light is bright and, as such, the hybrid display 10 may represent a color mixed with the color of the fluid 123 as a background color.

Figure 2:
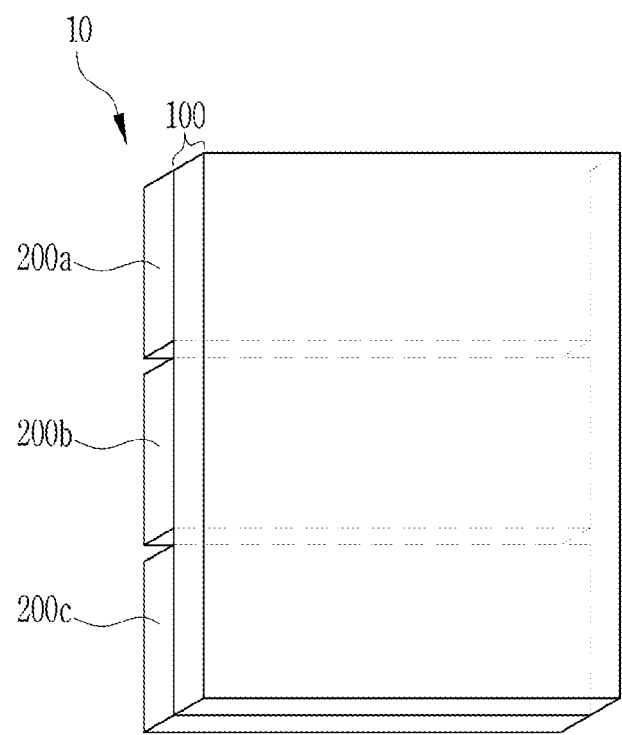
FIG. 2 is a view showing the case in which a light emitting module has divided structures to form background pixels in accordance with an embodiment of the present disclosure.

FIG. 2 is a view showing the case in which the light emitting module 200 has divided structures to form background pixels in accordance with an embodiment of the present disclosure.

As shown in FIG. 1, the light emitting module 200 may be formed to have a single structure extending throughout the entire area of the hybrid display 10. For example, when the first emission layer 210 of the emission module 200 operates, light of a first color may be output through the entirety of the hybrid display 10. Similarly, the second emission layer 220 and the third emission layer 230 of the light emitting module 200 may also output color light through the entirety of the hybrid display 10.

On the other hand, as shown in FIG. 2, the light emitting module 200 may be formed to have divided structures such that the whole area of the hybrid display 10 is divided into a plurality of background pixels. The background pixels may be determined to have various sizes and various forms. The background pixels are two or more sections divided from the whole area of the hybrid display 10. Here, each background pixel means a divided structure of the light emitting module 200 configured to output light through only a portion of the hybrid display 10. In FIG. 2, a first background pixel 200a may be constituted by one light emitting module 200, and a second background pixel 200b and a third background pixel 200c may also be constituted by respective light emitting modules 200. The light emitting modules 200 of the first background pixel 200a, the second background pixel 200b, and the third background pixel 200c may include emission layers of different colors, respectively. The numbers of emission layers in the light emitting modules 200 of the first background pixel 200a, the second background pixel 200b, and the third background pixel 200c may also be different from one another. The light emitting modules 200 may be controlled on a background-pixel basis. For example, the light emitting modules 200 may be controlled such that the light emitting module 200 corresponding to the first background pixel 200a emits light, and the light emitting module 200 corresponding to the second background pixel 200b does not emit light. Thus, display of a background color may be controlled in accordance with respective portions of the hybrid display 10.

Figure 3:
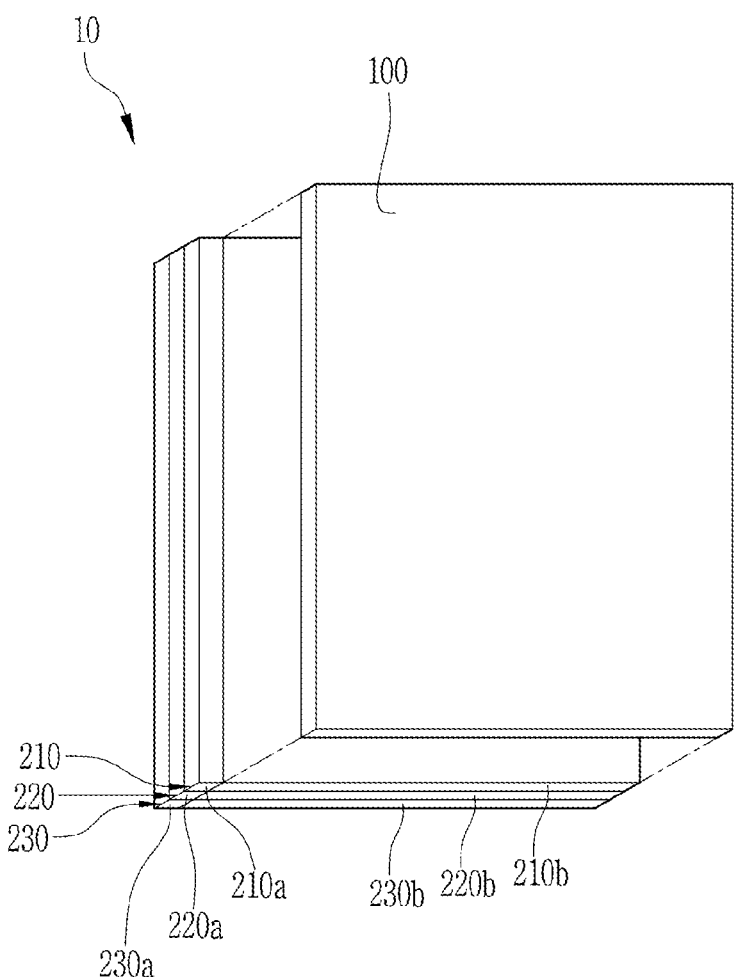
FIG. 3 is a view showing another structure of the light emitting module according to an embodiment of the present disclosure.

FIG. 3 is a view showing another structure of the light emitting module 200 according to an embodiment of the present disclosure.

The first emission layer 210, the second emission layer 220, and the third emission layer 230 of the light emitting module 200 may include respective light sources and respective light guide plates formed of a transparent material. The light guide plates may be sequentially stacked. The light sources may be disposed at one side of the light emitting module 200. Each light source and each light guide plate corresponding to each other may be interconnected such that light from the light source is output to the light guide plate.

Light output from the light source may be transmitted by the light guide plate such that the light is output toward the electrophoretic module 100. The first emission layer 210 may include a first light source 210a and a first light guide plate 210b, the second emission layer 220 may include a second light source 220a and a second light guide plate 220b, and the third emission layer 230 may include a third light source 230a and a third light guide plate 230b. The first light guide plate 210b, the second light guide plate 220b, and the third light guide plate 230b may be sequentially stacked. Light output from the third light guide plate 230b may reach the electrophoretic module 100 after passing through the second light guide plate 220b and the first light guide plate 210b. Light output from the second light guide plate 220b may reach the electrophoretic module 100 after passing through the first light guide plate 210b. The first light source 210a, the second light source 220a, and the third light source 230a may be independently controlled to be turned on/off.

Figure 4:
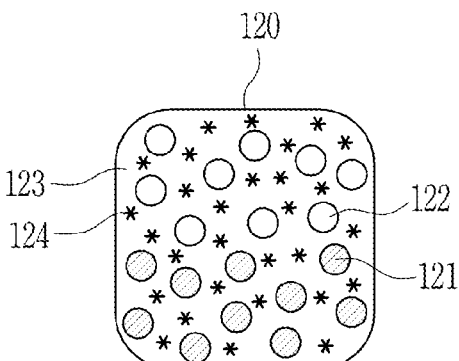
FIG. 4 is a view showing a capsule according to an embodiment of the present disclosure.

FIG. 4 is a view showing a capsule 120 according to an embodiment of the present disclosure.

A fluid 123 of a C-color may include a dye or pigment representing the C-color, and may selectively further include glitter 124 or a pearl. The fluid 123 may represent a color according to the color of the dye or pigment. The concentration of the dye or pigment in the fluid 123 may be determined to be a concentration allowing light output from the light emitting module 200 to pass through the fluid 123. When the concentration of the dye or pigment in the fluid 123 is varied, the darkness of the background color of the hybrid display 10 may be varied.

The color of the fluid 123 may be determined to be identical to the color of a particle. For example, the color of the fluid 123 may be determined to be identical to an A-color of an A-particle 121, but to be different from a B-color of a B-particle 122. When the light emitting module 200 does not output light, a pixel, at which the A-particle 121 is represented, may display the A-color, and a pixel, at which the fluid 123 is represented, may display the color of the fluid 123 (that is, the A-color). When the light emitting module 200 outputs light, the pixel, at which the A-particle 121 is represented, may display the A-color, and the pixel, at which the fluid 123 is represented, may display color-mixed light of the color of the fluid 123 (that is, the A-color) and the color of the light emitting module 200. When the light emitting module 200 is turned on, the pixel, at which the A-particle 121 is represented, and the pixel, at which the fluid 123 is represented, may display different colors, respectively, whereas, when the light emitting module 200 is turned off, the pixel, at which the A-particle 121 is represented, and the pixel, at which the fluid 123 is represented, may display the same color. Through this configuration, it may be possible to provide various visual effects through control of the light emitting module 200 based on brightness of ambient light.

The fluid 123 may further include a material capable of reflecting light. For example, the glitter 124 or pearl included in the fluid 123 may reflect light passing through the fluid 123 after being output from the light emitting module 200 or ambient light incident upon the capsule 120. The glitter 124 or pearl may further provide a decorative effect to the hybrid display 10.

Figure 5:
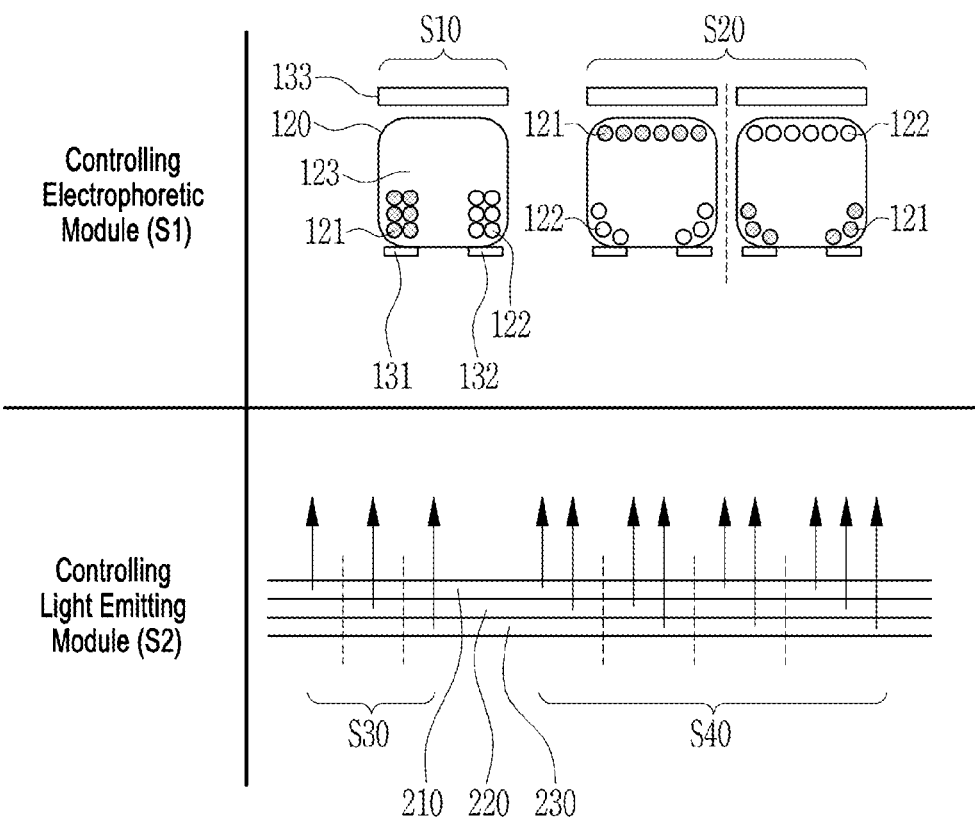
FIG. 5 is a view showing a control method of the hybrid display according to an embodiment of the present invention.

FIG. 5 is a view showing a control method of the hybrid display 10 according to an embodiment of the present invention.

The control method of the hybrid display 10 may include controlling the electrophoretic module 100 to display information through reflection of light incident from an exterior thereof (S1), and controlling the light emitting module 200 formed at a lower surface of the electrophoretic module 100 to output color light to the electrophoretic module 100 (S2). The color light output from the light emitting module 200 may be displayed in a state of being color-mixed with a color of the fluid 123 of the capsule 120 in the electrophoretic module 100.

Step S1 of controlling the electrophoretic module 100 and step S2 of controlling the light emitting module 200 may be independently executed. When ambient light is bright, the electrophoretic module 100 may display information by executing only step S1 of controlling the electrophoretic module 100 without executing step S2 of controlling the light emitting module 200. When ambient light is dark, the electrophoretic module 100 may execute both step S1 of controlling the electrophoretic module 100 and step S2 of controlling the light emitting module 200, thereby achieving an enhancement in visibility. Even when ambient light is bright, step S2 of controlling the light emitting module 200 may be executed, for color display. Step S1 of controlling the electrophoretic module 100 and step S2 of controlling the light emitting module 200 may be executed separately or simultaneously.

Step S1 of controlling the electrophoretic module 100 may include moving, to one side, particles of the capsule 120 of the electrophoretic module 100 such that light output from the light emitting module 200 passes through the capsule 120 (S10), and moving, to a front side, the particles of the capsule 120 such that the light output from the light emitting module 200 is blocked by the particles of the capsule 120, thereby causing the particles of the capsule 120 to be outwardly displayed (S20). Step S10 of moving to one side and step S20 of moving to the front side may be independently executed on a pixel basis or a capsule basis.

When it is desired to display a background color or a mixed color of output light of the light emitting module 200 with the color of the fluid 123 on the hybrid display 10, step S10 of moving to one side may be executed on a desired pixel or a desired capsule 120. When step S10 of moving to one side is executed, A-particles 121 may move toward the first electrode 131, and particles B-particles 122 may move toward the second electrode 132 and, as such, a passage allowing light to pass therethrough may be formed at the central portion of the capsule 120. In a state in which the light emitting module 200 does not operate, the pixel or the capsule 120, on which step S10 of moving to one side has been executed, may outwardly display the color of the fluid 123. For example, the color of the hybrid display 10 observed at the outside may be the background color (that is, the color of the fluid). In a state in which the light emitting module 200 operates, the pixel or the capsule 120, on which step S10 of moving to one side has been executed, may outwardly display color-mixed light of the color of the fluid 123 and the color of light output from the light emitting module 200 may be outwardly displayed. For example, the color (green) of the fluid 123 and the color (red) of the light output from the light emitting module 200 are mixed and, as such, yellow light may be displayed.

When step S20 of moving to the front side is executed, the A-particles 121 or the B-particles 122 move toward the third electrode 133, thereby blocking the light passage formed at the central portion of the capsule 120. In this case, the A-particles 121 or the B-particles 122 moved toward the third electrode 133 may be observed at the outside. Accordingly, the color of the pixel or the capsule 120 may represent the color of the particles. Color light output from the light emitting module 200 may be blocked by the particles moved toward the third electrode 133 and, as such, may not be outwardly displayed.

When step S20 of moving to the front side and step S10 of moving to one side are independently executed on a pixel basis or a capsule basis, text, an image, and other information may be displayed on the hybrid display 10. For example, the hybrid display 10 may display text or the like by disposing pixels, at which the B-particles 122 are observed, on a background constituted by pixels, at which the A-particles 122 are observed. In addition, the hybrid display 10 may display text, an image, or the like by disposing pixels, at which the A-particles 121 or the B-particles 122 are observed, on a background constituted by pixels, at which the fluid 123 is observed in accordance with disposition of the A-particles 121 and the B-particles 122 at one side. Furthermore, the hybrid displayer 10 may display text, an image, a background color, and other information by disposing pixels, at which the A-particles 121 are observed, pixels, at which the B-particles 122 are observed, and pixels, at which the fluid 123 is observed.

Step S2 of controlling the light emitting module 200 may include individual control S30 of operating only one of a first emission layer 210 configured to output light of a first color, a second emission layer 220 configured to output light of a second color, and a third emission layer 230 configured to output light of a third color, and complex control S40 of simultaneously operating two or more of the first emission layer 210, the second emission layer 220, and the third emission layer 230. One of the individual control S30 and the complex control S40 may be executed in accordance with given setting.

In the individual control S30, only one of the plurality of emission layers of the light emitting module 200 is turned on, and the remaining emission layers are turned off. When the individual control S30 is executed, the light emitting module 200 may output mono-color light. In the complex control S40, two or more of the plurality of emission layers of the light emitting module 200 are simultaneously turned on. For example, when only the first emission layer 210 is turned on, only the color light of the first emission layer 210 may be output. When only the second emission layer 220 is turned on, only the color light of the second emission layer 220 may be output. When only the third emission layer 230 is turned on, only the color light of the third emission layer 230 may be output.

When the complex control S40 is executed, the light emitting module 200 may output color-mixed light of two or more colors. For example, when the first emission layer 210 and the second emission layer 220 are turned on, color-mixed light of the color of the first emission layer 210 and the color of the second emission layer 220 may be output. When the second emission layer 220 and the third emission layer 230 are turned on, color-mixed light of the color of the second emission layer 220 and the color of the third emission layer 230 may be output. When the first emission layer 210 and the third emission layer 230 are turned on, color-mixed light of the color of the first emission layer 210 and the color of the third emission layer 230 may be output. When all of the first emission layer 210, the second emission layer 220, and the third emission layer 230 are turned on, color-mixed light of the color of the first emission layer 210, the color of the second emission layer 220, and the color of the third emission layer 230 may be output.

When the light emitting module 200 is formed to have a single structure extending continuously throughout the entirety of the hybrid display 10, as shown in FIG. 1, step S2 of controlling the light emitting module 200 may be consistently applied to the entirety of the light emitting module 200. When the light emitting module 200 is divided into a plurality of background pixels, as shown in FIG. 2, step S2 of controlling the light emitting module 200 may be executed on a background-pixel basis.

As apparent from the above description, the electrophoretic module 100 and the light emitting module 100 may be independently controlled and, as such, it may be possible to display text, an image, a color, and other information using the hybrid display 10.

The hybrid display 10 may operate in accordance with a control signal provided by a controller. The controller may provide an electrical signal meeting an electrode in accordance with step S1 of controlling the electrophoretic module 100, and may provide an electrical signal meeting an emission layer in accordance with step S2 of controlling the light emitting module 200.

In accordance with the present disclosure, it may be possible to provide a hybrid display capable of exhibiting excellent visibility even in a dark environment and variously changing the background color thereof.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

Simple modifications and alterations fall within the scope of the disclosure, and the protection scope of the disclosure will be apparent from the appended claims.

What is claimed is:

1. A hybrid display comprising:
an electrophoretic module configured to display information through reflection of light incident from an exterior thereof; and
a light emitting module formed at a lower surface of the electrophoretic module and configured to output color light to the electrophoretic module,
wherein the electrophoretic module comprises:
a first substrate;
a second substrate disposed to be spaced apart from the first substrate;
a plurality of capsules disposed between the first substrate and the second substrate, each of the capsules containing particles having a color and a fluid having a color therein; and
electrodes configured to apply an electric field to the capsule, thereby moving the particles,
wherein the electrodes are disposed at both lower ends of each capsule such that movement of the particles toward respective ends allows the color light output from the light emitting module to pass through the capsule, and
wherein the color light output from the light emitting module is mixed with the color of the fluid, and is then outwardly output.

2. The hybrid display of claim 1, wherein:
the light emitting module comprises:
a first emission layer configured to output light of a first color;
a second emission layer configured to output light of a second color; and
a third emission layer configured to output light of a third color; and the first emission layer, the second emission layer, and the third emission layer are made of transparent materials, respectively, and are formed through sequential stacking thereof.

3. The hybrid display of claim 1, wherein:
the light emitting module comprises:
a first emission layer configured to output light of a first color;
a second emission layer configured to output light of a second color; and
a third emission layer configured to output light of a third color; and
each of the first emission layer, the second emission layer, and the third emission layer comprises a light source and a light guide plate made of a transparent material, and the light guide plates of the first emission layer, the second emission layer, and the third emission layer are formed through sequential stacking thereof.

4. The hybrid display of claim 1, wherein:
each of the plurality of capsules comprises:
an A-particle of an A-color;
a B-particle of a B-color; and
a fluid of a C-color; and
the electrode comprises:
a first electrode formed on the first substrate using a transparent material and disposed at one side under the capsule;
a second electrode formed on the first substrate using a transparent material and disposed at an opposite side under the capsule; and
a third electrode formed under the second substrate using a transparent material and disposed on the capsule.

5. The hybrid display of claim 4, wherein the fluid of the C-color comprises a dye or a pigment representing the C-color, and selectively further comprises glitter or a pearl.

6. A control method of a hybrid display comprising:
controlling an electrophoretic module to display information through reflection of light incident from an exterior thereof; and
controlling a light emitting module formed at a lower surface of the electrophoretic module to output color light to the electrophoretic module,
wherein the color light output from the light emitting module is displayed in a state of being color-mixed with a color of a fluid of a capsule in the electrophoretic module,
wherein the electrophoretic module includes a plurality of capsules each including particles having a color and a fluid having a color therein, and electrodes disposed at both lower ends of each capsule and configured to apply an electric field to the capsule to move the particles, and
wherein the controlling an electrophoretic module comprises
moving, toward respective ends in response to an operation of the electrodes, the particles within the capsule such that the color light output from the light emitting module passes through the capsule.

7. The control method of claim 6, wherein:
the controlling an electrophoretic module comprises:
moving, toward an upper side of the capsule, the particles of the capsule such that the color light output from the light emitting module is blocked by the particles of the capsule, thereby causing the particles of the capsule to be outwardly displayed; and the moving of particles toward respective ends and the moving of the particles toward an upper side are independently executed on a pixel basis.

8. The control method of claim 6, wherein:

the controlling a light emitting module comprises:

individual control of operating only one of a first emission layer configured to output light of a first color, a second emission layer configured to output light of a second color, and a third emission layer configured to output light of a third color; and complex control of simultaneously operating two or more of the first emission layer, the second emission layer, and the third emission layer; and one of the individual control and the complex control is executed in accordance with given setting.

\* \* \* \* \*